Patented Apr. 1, 1947

2,418,224

UNITED STATES PATENT OFFICE 2,418,224

CELLULOSE ACETATE PLASTICIZED WITH AN ARYL MORPHOLIDOPHOSPHATE

Louis W. Georges, New Orleans, La., assignor to the United States of America, as represented by Claude R. Wickard, Secretary of Agriculture, and his successors in office No Drawing. Application September 23, 1944, Serial No. 555,570

3 Claims. (Cl. 106—176)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to film-forming and coating materials, and more particularly to plasticizers which are solvents for cellulose acetate and which retard the burning rate of cellulose acetate compositions.

Triphenyl phosphate is the compound ordinarily used to plasticize cellulose acetate when it is essential that the plasticized composition be fire retardant. However, this material is not a solvent for acetone-soluble cellulose acetate at temperatures up to 180° C. Injection molding practice often requires a composition with a combination of soft flow and fire retardant properties. This combination of properties cannot be attained with triphenyl phosphate except by using a relatively high concentration of the plasticizer in the composition with a resulting sacrifice of other desirable physical properties, although this difficulty may be overcome to some extent by admixture of triphenyl phosphate with a "solvent-type" plasticizer such as dimethyl phthalate.

I have now found that the class of compounds known as aryl morpholidophosphates will plasticize cellulose acetate to produce compositions which have good flow characteristics and which do not support combustion. These compounds may be prepared by aminolysis of the aryl chlorophosphate with morpholine. By the term "aryl morpholidophosphate" as used herein, I make reference to a class of compounds which correspond to the following general formulae:

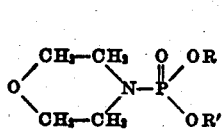

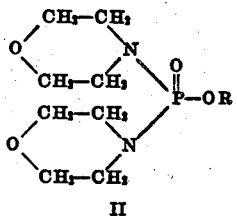

I II where R and R' represent an aryl or substituted aryl radical. The presence of a second morpholine residue in the phosphate compound as illustrated above in II greatly enhances its solvent action on cellulose acetate.

Examples illustrating the preparation and use of the compounds of this invention are given below.

Example I

The di(o-cresyl) chlorophosphate was first prepared by heating o-cresol (210 g.) and phosphorus oxychloride (150 g.) under reflux for 6 hours. During the first five hours, the temperature of the reaction mixture was raised gradually to 180° C. and during the last hour of heating it was allowed to rise to 245° C. The reaction product was distilled under reduced pressure. The first fraction distilled over at 94°–96° C. at 2–3 mm. and was characterized by chlorine and phosphorus analyses as the cresyl dichlorophosphate. The main fraction distilled over at 160°–173° C. at 2–3 mm. and from its chlorine and phosphorus analyses was characterized as dicresyl chlorophosphate. The morpholide derivative of this latter compound was prepared by adding dropwise a solution of di(o-cresyl) chlorophosphate (59.3 g.) in 70 cc. of carbon tetrachloride to a well-stirred solution of morpholine (35.8 g.) in 400 cc. of carbon tetrachloride. There was considerable evolution of heat with the formation of a heavy precipitate of morpholine hydrochloride. Stirring was continued for 15 minutes after the addition of the chlorophosphate. The crystalline precipitate was filtered and washed several times with carbon tetrachloride. A product with a slight yellow color was obtained after one recrystallization from ligroin (90°–120° C.). The yellow color was removed by washing with water. After drying the compound melted at 46°–48° C. Nitrogen and phosphorus analyses characterized the compound as the dicresyl morpholidophosphate.

Cellulose acetate was dissolved in a mixture of dicresyl morpholidophosphate and mixed acetone solvent according to the proportions shown below:

| | Parts |
|---|---|
| Cellulose acetate (38% acetyl) | 100 |
| Di(o-cresyl) morpholidophosphate | 30 |
| Acetone/ethanol/ethyl acetate (80/15/5) | 350 |

The resulting "dope" was cast on a glass plate and leveled to the desired thickness. After sufficient air-drying the film was stripped from the plate and most of the residual solvent removed by further drying at 60° C. A clear, transparent film was obtained in this manner.

Example II

Diphenyl morpholidophosphate has been reported by Audrieth and Toy (J. Am. Chem. Soc., 64, 1337 (1942)) and was prepared by the same method as that described for the dicresyl compound.

Using the following proportions:

| | Parts |
|---|---|
| Cellulose acetate (38% acetyl) | 100 |
| Diphenyl morpholidophosphate | 30 |
| Acetone/ethanol/ethyl acetate (80/15/5) | 350 | a film was made in the same manner as described above in Example I.

A composition of matter was also prepared of cellulose acetate (38% acetyl) with triphenyl phosphate in the same proportions as shown in Examples I and II and a film prepared in like manner. The films thus obtained were subjected to a standard burning rate test. It was found that the two aryl morpholidophosphates were equal in fire retarding property to that of triphenyl phosphate which is the compound ordinarily used with cellulose acetate when it is desirable to have a composition that will not support combustion.

Example III

A molding powder was made of the following composition of matter by working the two components on heated mixing rolls until the mass was thoroughly colloided and grinding the resulting material in a mill.

| | Parts |
|---|---|
| Cellulose acetate (38% acetyl) | 100 |
| Diphenyl morpholidophosphate | 35 |

In a similar manner, molding powders were prepared of compositions of matter containing cellulose acetate colloided with triphenyl phosphate, and with methyl phthalyl ethyl glycollate in the proportion of 100 parts cellulose acetate to 35 parts of the plasticizer. Flow temperature tests on the above three molding powders were made in accordance with the standards of the American Society for Testing Materials. The flow temperatures for the compositions containing diphenyl morpholidophosphate, triphenyl phosphate, and methyl phthalyl ethyl glycollate were 146° C., 165° C., and 147.5° C., respectively. These results show that with compositions of cellulose acetate containing the same concentrations of plasticizer, diphenyl morpholidophosphate gives a much softer flowing compound than triphenyl phosphate, the standard fire-retarding plasticizer, and a slightly softer flowing compound than a standard "solvent-type" plasticizer such as methyl phthalyl ethyl glycollate.

This invention is not limited by the foregoing examples, since other aryl radicals may be substituted for phenyl or cresyl in the phosphate derivatives. Also, radicals of an aliphatic nature may be used as the ester groups such as alkyl or glycol-ether and the morpholidophosphate esters prepared by reacting the desired ester substituted phosphoric acid with morpholine in the presence of an azeotropic agent which will remove the water formed.

It should also be understood that the concentration of the morpholidophosphate compound used in the compositions of matter as shown in the above examples is illustrative only, and that the amount may be varied within wide limits, depending upon the particular application. Although the morpholidophosphate esters are especially useful with cellulose acetate because of their solvent action, it will be understood that these compounds will be useful in plasticizing other cellulose esters as well as cellulose ethers. It may be desired also to use these morpholidophosphate esters in compositions of matter where the article of manufacture is sheet stock made by the block-pressing method in which process it is essential or desirable to have a "solvent-type" fire-retarding plasticizer.

Having thus described my invention, I claim:

1. A film-forming composition of matter comprising as its essential film-forming ingredient cellulose acetate and, as a plasticizer therefor, an aryl ester of a compound selected from the group consisting of mono-morpholido and di-morpholido phosphoric acids.

2. A film-forming composition of matter comprising as its essential film-forming ingredient cellulose acetate and, as a plasticizer therefor, diphenyl morpholidophosphate.

3. A film-forming composition of matter comprising as its essential film-forming ingredient cellulose acetate and, as a plasticizer therefor, dicresyl morpholidophosphate.

LOUIS W. GEORGES.

REFERENCES CITED

The following references are of record in the file of this patent:

UNITED STATES PATENTS

| Number | Name | Date |
|---|---|---|
| 2,186,628 | Dickey | Jan. 9, 1940 |
| 2,188,322 | Tattersall | Jan. 30, 1940 |
| 2,151,380 | Flint | Mar. 21, 1939 |